Patented Mar. 24, 1936

2,035,364

UNITED STATES PATENT OFFICE 2,035,364

GLASS MOLDING MATERIAL

Oliver K. Carpenter, New Cumberland, W. Va., assignor to The Duraloy Company, Pittsburgh, Pa., a corporation of Delaware No Drawing. Application January 25, 1934, Serial No. 708,291

5 Claims. (Cl. 49—65)

This invention relates to apparatus for forming and shaping hot plastics, such as glass, and more particularly to molds, plungers, neck rings, metallic chills and handling means of all characters which are employed in the glass industry to handle the hot plastic glass.

Prior to the present invention a number of different materials have been used for molds for casting or forming hot plastic glass. Cast iron has long been employed in this capacity; however, its use gives certain definite objectionable results. For example, in the use of cast iron for molds and plungers, in the formation of glassware the graphitic carbon contained in the cast iron forms a carbonaceous scale or film on the articles after some little use. This film is believed to be caused by the high heat of the glass during the molding or forming operation which converts some of the combined carbon into graphitic carbon on the surfaces and is quite objectionable due to the fact that such a film very definitely decreases the luster of the molded glass. It has, therefore, been necessary in the past to clean, very frequently, the molds and plungers in order to maintain the high quality of the glass manufactured.

It has also been found that mold parts manufactured from ordinary cast iron have a considerable growth upon increases in temperature, say up to over 1500° F., and this change in size of the molding equipment, occasionally amounting to as much as 50% in volume, is very undesirable and leads to the production of articles non-uniform in size and shape. Moreover, molds made from cast iron, steel, and other similar materials or alloys have been very susceptible to oxidation, particularly at high temperatures, to which they are subjected, thereby materially reducing their life and effectiveness.

There has been some attempt in the past to manufacture molding apparatus from the so-called high chrome and/or nickel alloys which belong in the "stainless steel" category. Various chrome-nickel alloys have been made up and employed, however, none have proven satisfactory. They are quite expensive and are hard to machine, work or form during their manufacture. The chrome-nickel steels tend to develop surface cracks in use particularly if machined, and these surface irregularities are very objectionable. The high-chrome high-nickel steels have, moreover, a tendency to cause an adhesion of glass to the polished surface of the metal, and in some grades of glass some of the constituent parts of the glass seem to react chemically with the metal, thereby discoloring the glass.

By the present invention the foregoing and other difficulties of prior known practices have been avoided and articles can be readily manufactured and worked to provide molding equipment for hot glass of all kinds. The articles of the present invention are capable of being employed over long periods of hard use in glass molding operations without the formation of material amounts of oxide or carbon films, are little affected in size or growth by temperature changes, and exhibit little or no tendency to develop surface cracks and similar objectionable blemishes. The articles of the present invention are preferably composed of iron castings containing from about 16% to about 20% chromium, and from about 1% to about 2% carbon. If desired, from a trace up to about 5% of other alloying materials from a group including titanium, molybdenum, selenium, columbium and/or nitrogen may be added. By the term "alloying materials from a group including titanium, molybdenum, selenium, etc." it is intended to mean any of the constituents alone or together or various combinations thereof so long as the total amount from the group does not exceed about 5%.

It has been found that articles made from castings of this composition are particularly adapted for use in the glass industry wherein the same can be used for blowing and pressing molds, neck rings, pressing plungers, blow heads, stools, and other glass contacting parts. The growth of such articles is only about 2% in volume during increases in temperature up to and over 1500° F., they are not readily susceptible to oxidation, and under usual operating conditions can be used continuously for many hundreds of hours without the loss of luster in the glass or frequent polishing. A very fine permanent luster is imparted to all glassware formed thereby even after long use of the molding equipment. The chromium content seems to be fairly critical. Under about 16% of chromium a rather definite tendency toward oxidation is encountered, and also there is a tendency for the carbon content to change from a combined state to a graphitic state, which is not desirable. With chromium contents greater than about 20% the thermal conductivity of the material is reduced to such an extent that the material possesses a rather pronounced tendency to crack under thermal shock. The tendency to oxidation and formation of graphitic carbon, however, does not occur to a pronounced degree with chromium contents above about 16%. Accordingly, I prefer to maintain the chromium content between about 16% and about 18%.

The carbon range of from about 1% to about 2% is preferable, as aforesaid, for with carbon contents much above 2% considerable graphitic carbon necessarily is present, or is formed during use of the articles and tends to destroy the luster of the glass, probably due to the formation of the film of graphitic carbon on the surface of the mold parts or articles. Under about 1% of carbon the material is difficult to machine. Between about 1% and about 2% of carbon the articles are readily machinable, while the tendency to the formation of a graphitic film is not sufficiently pronounced to be important. The combination of chromium and carbon within the foregoing ranges results in castings which possess the combined properties of freedom from material amounts of graphitic carbon in surface films, ready machinability, very low growth during use, freedom from surface cracks, high strength, production of highly lustrous glass articles, and extremely long life.

A particular composition of the material which has been found to be successful in the glass industry shows an analysis of about 18% chromium, about 1.25% to about 1.50% carbon, and the remainder being iron. As much as about 5% of other alloying materials from the group comprising titanium, molybdenum, senelium, columbium and/or nitrogen may be included if desired.

Unlike chrome-nickel or stainless steels, the articles of the present invention can be readily formed, worked and machined by usual commercial apparatus and methods to produce molding or pressing equipment. The surface texture of the material even after machining, engraving and cutting operations, is substantially free from undesirable surface cracks or blemishes such as are prevalent in machined stainless steels.

Cast articles of the foregoing composition are preferably thoroughly soaked and annealed at about 1400° F., and then slowly cooled. This treatment makes the articles susceptible to easy machining.

In accordance with the patent statutes certain embodiments of the present invention have been described in detail. However, it will be understood that the invention is not limited thereto or thereby, but is defined in the appended claims.

What is claimed is:—

1. A cast metal article for use in contact with hot plastics, such as molten glass, containing from about 16% to about 20% of chromium, from about 1% to about 2% of carbon, the remainder being iron, said article being highly resistant to the formation of surface cracks, being readily machinable, and being capable of imparting a high luster to glassware contacting therewith while in a plastic condition, over wide temperature ranges and during long periods of use.

2. A cast metal article for use in contact with hot plastics, such as molten glass, containing from about 16% to about 20% of chromium, from about 1% to about 2% of carbon, and between about 78% and 83% of iron, said article being highly resistant to the formation of surface cracks, being readily machinable, and being capable of imparting a high luster to glassware contacting therewith while in a plastic condition, over wide temperature ranges and during long periods of use.

3. A plastic-glass-shaping casting containing between about 18% and about 20% chromium and between about 1% and 2% of carbon, substantially all the remainder being iron.

4. A cast metal article for use in molding hot plastic glass, said article composed of about 16% to about 20% chromium, about 1% to about 2% carbon, and between about 78% and about 83% of iron, said article being readily machined and engraved and substantially free from surface cracks or blemishes before and after machining, said article being capable of imparting a high luster to molded glassware formed thereby, and said article being substantially unchanged in size after long periods of use under wide ranges of temperature.

5. A cast metal article, against which glass is to be cast, said article containing about 18% chromium, between about 1¼% and about 1½% of carbon, and substantially the entire remainder being iron.

OLIVER K. CARPENTER.